Sept. 11, 1934.  W. B. FAGEOL  1,973,144
MULTIWHEEL TWIN-MOTOR ROAD VEHICLE
Filed July 18, 1929  2 Sheets—Sheet 1
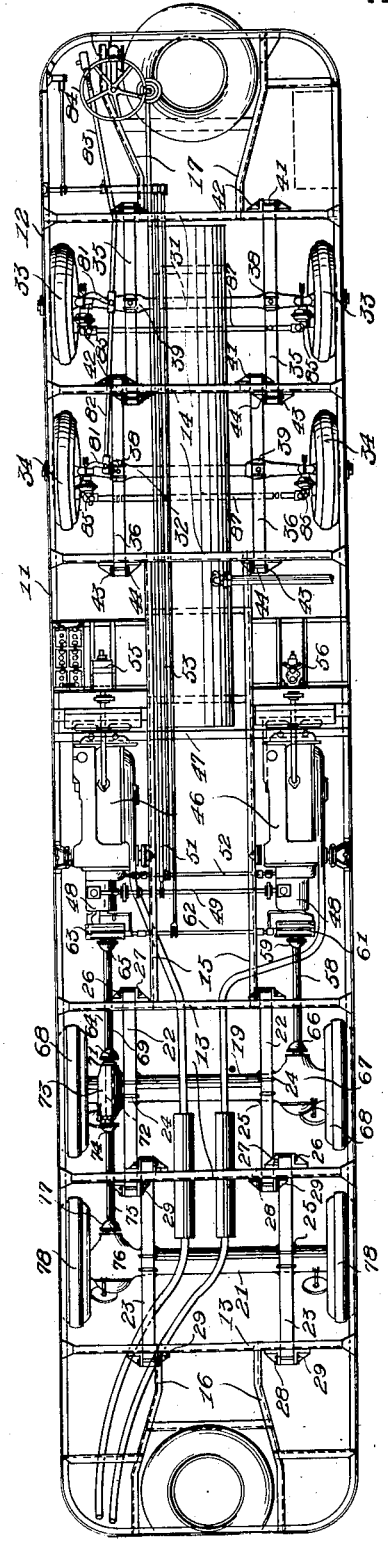
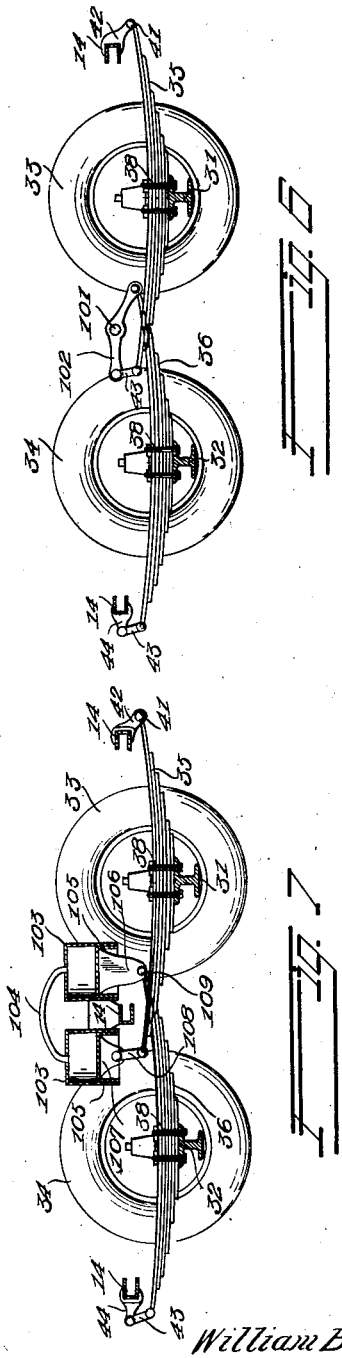
Inventor
*William B. Fageol*
By
*Strauch & Hoffman*
Attorneys Sept. 11, 1934.   W. B. FAGEOL   1,973,144
MULTIWHEEL TWIN-MOTOR ROAD VEHICLE
Filed July 18, 1929   2 Sheets-Sheet 2
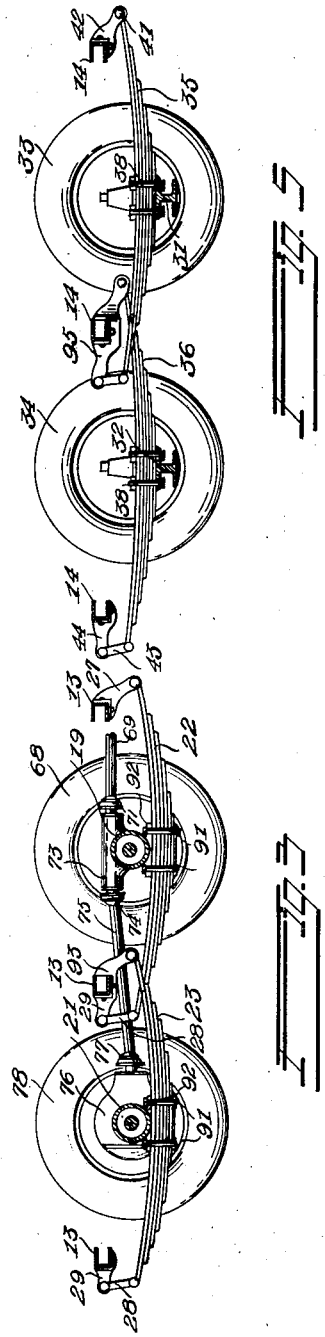
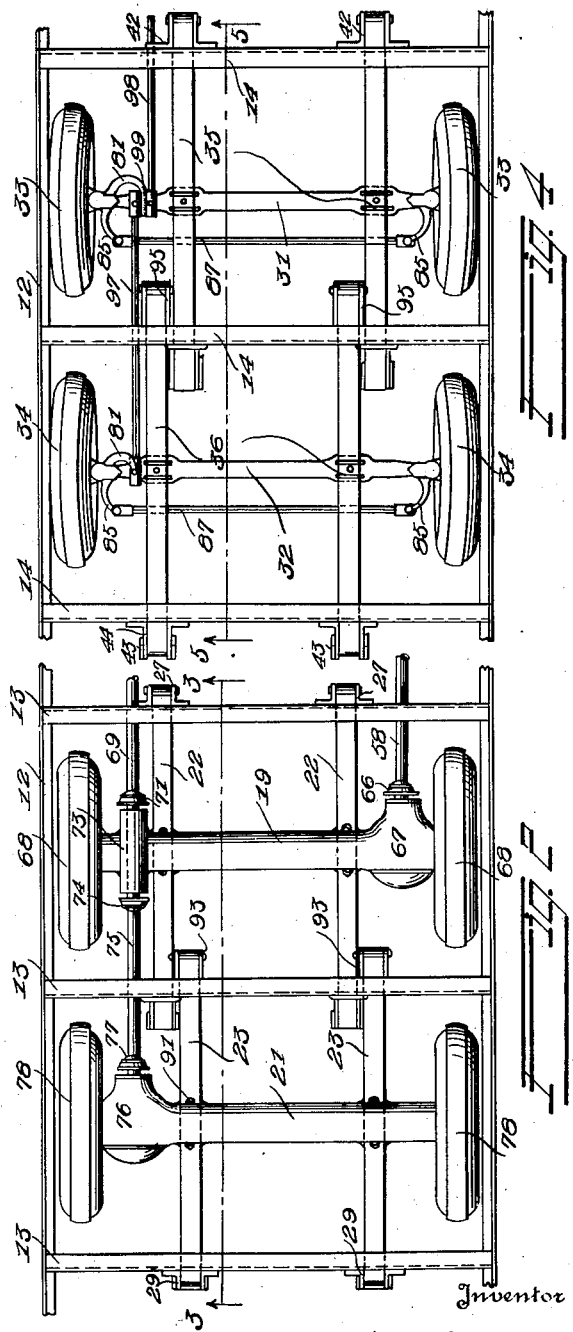
Inventor
William B. Fageol
By Strauch & Hoffman
Attorneys Patented Sept. 11, 1934

1,973,144

UNITED STATES PATENT OFFICE 1,973,144

MULTIWHEEL TWIN-MOTOR ROAD VEHICLE

William B. Fageol, Kent, Ohio, assignor to Twin Coach Company, Kent, Ohio, a corporation of Delaware Application July 18, 1929, Serial No. 379,259

5 Claims. (Cl. 180—22)

This invention relates to multi-wheel road vehicles, particularly, to a passenger carrying vehicle intended for use on relatively smooth roads.

More particularly, the invention relates to a motor vehicle embodying a pair of motors and a pair of driven axles in which one of the motors is used to drive the wheels on one of the axles, while the other motor is being used to drive the wheels of the other axle. Preferably, but not necessarily, these pair of motors are disposed adjacent the sides of the vehicle body midway between the ends thereof to provide a construction that is balanced with respect to a central longitudinal, as well as a central transverse line, passing through the body that serves to support the motor.

In multi-wheel road vehicles heretofore proposed it has been the general practice to secure the pairs of axles together to, in effect, form a truck. In some instances, springs were utilized to interconnect the axles together, and such springs have been pivotally associated with the frame in such manner that the adjacent axles are permitted to have a very substantial swinging movement with respect to the frame about the pivotal connections of the springs thereto. In multi-wheel road vehicles in use, however, the movement of one axle can not take place independently of the other, because of the practice of connecting the pairs of axles together, so that when the wheels carried by one of the axles rides over a substantial elevation, or drops into a substantial depression, the wheels of the adjacent axle will remain on the road at all times. Such constructions provide great flexibility and are essential for use on multi-wheel vehicles, that are intended to be operated over very rough roads. The flexibility, just referred to, is accordingly essential in trucks that are intended to haul supplies or commodities from relatively inaccessible places over unimproved highways.

Heretofore, it has also been the general practice to attach the springs to heavy longitudinally extending chassis frame members that form supports for all of the parts that enter into the construction of a multi-wheel vehicle. The springs were arranged substantially parallel to the heavy frame members and attached thereto, and when it was sought to use springs individual to each axle to secure the axles to the frame, relatively short springs had to be used to avoid interference without spacing the axles so far apart that the wheels on the rear driven axles have to be provided with steering mechanism.

In my copending application Ser. No. 355,755, now Patent No. 1,877,653 I have disclosed a road vehicle in which the base of the body is relied upon to take the place of the heavy structural members, that ordinarily extend longitudinally of the vehicle, and said base supports the motors and serves as the means to which the axles are attached. This invention presents an improvement over the construction shown in that application in providing additional wheels and axles for supporting the weight of the vehicle, enabling longer bodies to be used and distributing the weight thereof over a larger number of wheels, reducing the wear and tear on the roads, and increasing the effective traction of the wheels with such other additional advantages as are inherent in a multi-wheel vehicle.

I have found that for use on motor coaches that are primarily designed for operation at high speed over modern smooth roads, that it is unnecessary to interconnect the respective pairs of axles that support the front and rear end of the body of the bus to provide extreme flexibility and so that said pairs of axles constitute, in effect, a truck supporting each end of the body, because of the fact that motor coaches are not run over unusually rough roads so that they are not subjected to the extreme conditions to which freight carrying trucks intended for general hauling purposes are subjected. I have found that the construction described in my copending application above referred to lends itself admirably for conversion into a multi-wheel road vehicle by the addition thereto of a further axle to support the rear end of the frame and a further axle to support the forward end thereof. This is true, because I have found that it is entirely feasible to utilize relatively long and, accordingly, relatively resilient springs to independently connect the several axles to the frame, because of the fact that the transverse base frame members are of said construction, that they may be utilized as points of attachment for said springs and the springs may, accordingly, be arranged so that they substantially overlap, permitting the use of long springs without requiring that the axles be spaced from each other to such a degree as to make it impractical to dispense with the steering of the wheels of one or both of the rear of the driven axles.

I have also found that it is feasible to utilize one of the twin motors to drive the wheels on one of the drive axles and utilize the other of the twin motors, included in the application above referred to, to drive the wheels of the other drive axle, and that the independent attachment of the several axles to the frame contributes greatly to the effectiveness and efficiency of the driving of the wheels due to the fact that while the axles are sufficiently flexibly attached to the frame for all practical purposes, the movement of the axles does not assume such proportions as to introduce substantial constantly changing angularity of the drive shafts.

The primary object of the invention accordingly, is to provide a multi-wheel road vehicle in which the axles are independently attached to the frame which constitutes at the same time the base of the body in such manner as to permit the use of relatively long springs with corresponding flexibility.

A further object of the invention is to provide a multi-wheel road vehicle in which the axles are secured to the frame of the vehicle by the springs that are arranged in offset in overlapped relation and attached to frame transverse members that are spaced so as to permit the oscillation of the axles within the space thus provided.

A still further object of the invention is to provide a multi-wheel road vehicle including a pair of motors, arranged so that one of the motors drives the wheels on one of the drive axles while the other motor drives the wheels of the other drive axles, in which the axles are flexibly attached to the frame by independent springs, so as to permit the necessary relative movement of the several drive axles without introducing substantial and abrupt changes in the angularity of the necessary flexible shaft that interconnects the several motors to the drive axles.

A still further object of the invention is to provide a multi-wheel road vehicle in which the axles as well as a plurality of motors are all supported upon the base frame of the body in such manner as to permit the lowering of the center of gravity of the vehicle while permitting ample movement of the wheels with respect to said base frame.

Further objects of the invention are such as may be attained by a utilization of the various combinations and sub-combinations hereinafter set forth and as defined by the terms of the appended claims.

Referring to the drawings:—

Figure 1 is a top plan view of a body frame construction with the wheels, power mechanism, and control elements associated therewith and disclosing the application of one of the embodiments of my invention.

Figure 2 is a top plan view of a portion of the body frame construction disclosing the application of a slightly modified embodiment of my invention.

Figure 3 is a longitudinal vertical sectional view of the construction illustrated in Figure 2 substantially on the line 3—3 of Figure 2.

Figure 4 is a view similar to Figure 2 but of the forward end of the body frame construction and showing the application of a still further modification of my invention.

Figure 5 is a longitudinal vertical sectional view of the construction illustrated in Figure 4 taken substantially on line 5—5 of Figure 4.

Figure 6 is a view similar to Figure 5 disclosing a further modification of the invention.

Figure 7 is a view similar to Figures 5 and 6 disclosing a still further modification of my invention.

Referring to the accompanying drawings for a detailed disclosure of the invention in which like parts are designated by like reference characters and referring first to Figure 1 in which 11 designates the base of a body frame construction, which is of the general construction of that disclosed in Patent No. 1,877,653 which issued on my co-pending application Serial No. 355,755, filed April 17, 1929; and which, as disclosed in said co-pending application, is a relatively light skeleton frame structure to which the sides and ends of the vehicle body are secured to form the usual box-like body which unlike constructions heretofore proposed, includes no heavy longitudinal structural members. On the other hand, the vehicle body when secured to said light base frame construction serves, in effect, as a trussed arrangement for lending rigidity to the base frame construction, so that the base frame construction is well adapted for the support of the springs to which the axles are secured, as well as being adequate in strength to sustain the power units and various control elements.

While the body base-frame construction 11 is of the same general formation and is constructed in the same general way as that disclosed in my said co-pending application, the frame construction 11 of the present application is adapted for a multi-wheel road vehicle thereby necessitating a substantially longer frame construction than that disclosed in my said co-pending application. Said base-frame construction 11 is further modified in a manner presently to be described in accordance with my present invention.

The base frame construction 11, in accordance with my present invention, preferably comprises a marginal frame member 12 to which the lower edges of the body, side and end members are secured as disclosed in Figures 5 and 45 of the drawings of said co-pending application and a plurality of longitudinally spaced and transversely disposed floor supporting channel members which, as in said co-pending application, are disposed substantially above frame member 12 with the opposite ends thereof secured to frame member 12. The transversely disposed channel members while serving as a support for the body floor are in accordance with my present invention further utilized for the attachment of the opposite ends of leaf spring assemblies later described and while a greater or less number of the transverse channel members may be utilized I preferably employ 6 such members three of which are designated by the reference characters 13 are disposed adjacent the rear end of frame construction 11, and the other three of which designated by the reference characters 14 are disposed adjacent the front end of frame construction 11. The frame construction 11 further comprises short channel members 15 which extend longitudinally of frame construction 11 intermediate the adjacent ones of the rear and front channel members 13 and 14 with the ends suitably secured thereto and rear and front angularly disposed channel members 16 and 17 respectively for a purpose later referred to.

Disposed below and intermediate the forward pair of rear channel members 13 is a drive axle housing 19 and disposed below and intermediate the rear pair of channel members 13 is a drive axle housing 21. Axle housing 19 is yieldably connected with the adjacent channel members 13 by means of a pair of leaf spring assemblies 22 and axle housing 21 is yieldably secured to the adjacent channel members 13 by means of a pair of leaf spring assemblies 23. As indicated in Figure 1 the leaf spring assemblies 22 and 23 are equally spaced longitudinally of their respective axle housings 19 and 21 but the spring assemblies 22 are offset laterally relative to spring assemblies 23 for a purpose hereinafter referred to.

The leaf spring assemblies 22 and 23 are secured intermediate their ends by U-bolts 24 to suitable seats or pads 25 suitably formed on axle housings 19 and 21. The forward ends of springs 22 and 23 are pivotally secured by means of pins 26 supported in brackets 27 rigidly secured to adjacent channel members 13 and projecting forwardly thereof. The rear ends of springs 22 and 23 are flexibly connected by means of shackles 28 to brackets 29 rigidly secured to adjacent channel members 13 and projecting rearwardly thereof.

By connecting the opposite ends of springs 22 and 23 in the manner disclosed, which is permitted by offsetting the springs, relatively long spring assemblies are provided for each of the axle housings 19 and 21, thus providing very flexible spring suspensions whereby shocks and vibrations resulting from road irregularities are readily absorbed without the transmission thereof to the vehicle body supported on frame 11. It will be seen that due to frame construction 11 comprising only members 13, and including no heavy longitudinal members, adjacent axle housings 19 and 21 the housings have ample room for vertical oscillatory movement.

The front end of body frame 11, in acordance with the present invention is supported by axles 31 and 32 respectively provided with steering wheels 33 and 34 and yieldably connected with frame 11 by leaf spring assemblies 35 and 36 respectively. The leaf spring assemblies 35 and 36 are laterally offset in the same manner as spring assemblies 22 and 23 and the intermediate portions thereof are secured by U-bolts 38 to suitable seats 39 on axles 31 and 32. The forward ends of springs 35 and 36 are pivotally secured by pins 41 to brackets 42 secured to adjacent channel members 14 and projecting forwardly thereof. The rear ends of springs 35 and 36 are flexibly connected by shackles 43 to brackets 44 secured to adjacent channel members 14 and projecting rearwardly thereof. It will therefore be seen that by offsetting springs 35 and 36 and connecting opposite ends thereof to the opposite sides of the adjacent channel members 14 in the manner above set forth relatively long springs are provided for axles 31 and 32, in the same manner as above set forth relative to springs 22 and 23, thereby providing a very flexible spring suspension for axles 31 and 32 permitting each of the relatively closely spaced wheels to follow road irregularities of the degree encountered on modern roads. The construction is intended for passenger carrying busses and such vehicles generally follow the modern highways.

The vehicle in accordance with the present invention is disclosed as provided with a pair of internal combustion motors 46 which are disposed as in my said co-pending application, that is, one motor is disposed adjacent each side of frame 11 and substantially midway of the length thereof, the motors 46 being yieldably connected through a three point yieldable suspension to member 12, channel members 15 and a transversely extending member 47 in the manner disclosed in my said application. The motors 46 have associated therewith transmissions 48 operable by a transverse shaft 49 having an actuating rod 51 connected therewith. Said motors further have associated therewith the various elements disclosed in my said application, including a clutch actuating shaft 52 operable through a rod 53, a generator 55 associated with one motor 46 and an air compressor 56 associated with the other motor 46. A drive shaft 58 has a universal connection 59 adjacent one end thereof with a shaft brake 61 which brake is operable through a transverse shaft 62 which in turn simultaneously actuates a shaft brake 63 adjacent the opposite motor 46 adjacent which a sectional drive shaft 64 is universally connected as indicated at 65. Drive shaft 58 is actuated by one motor 46 and has a universal connection 66 adjacent a differential housing 67 of axle housing 19 for driving wheels 68 secured to the opposite ends of axles in housing 19 driven through differential in housing 67. The sectional drive shaft 64 comprises a section 69 having a universal connection 71 with the adjacent section 72 rotatably journaled in a mid-ship bearing 73 in housing 19, the opposite end of which section 72 has a universal connection 74 with a third section 75 which drives a differential 76 in housing 21 through a universal connection 77, the differential 76 imparting rotation to drive wheels 78 carried by axle sections in housing 21.

From the foregoing disclosure it will be seen that one pair of drive wheels are driven by one of the motors 46 and the other pair of drive wheels are driven by the other motor 46, and that one pair of drive wheels are driven directly from the transmission associated with one of the motors and that the other pair of drive wheels are driven by a sectional flexible shaft supported for rotation intermediate the length thereof by a mid-ship bearing supported on the axle housing of the drive wheels driven directly from the transmission associated with one of the motors.

The dirigible wheels 33 and 34 are connected for simultaneous steering movement which in accordance with the present invention is affected in the following manner. The wheels 33 and 34 are pivotally connected by vertical king pins in the usual manner for effecting independent movement thereof about a vertical axis. One pair of wheels 33 and 34 at corresponding ends of axles 31 and 32 are each provided with an arm 81 the ends of which arms have a spring yielding ball connection with opposite ends of a connecting drag link 82 and the rear end of a steering wheel actuated drag link 83 has a spring ball connection with arm 81 of wheel 33 whereby upon actuation of steering wheel 84 wheels 33 and 34 at adjacent ends of axles 31 and 32 are simultaneously rotated about individual vertical axes. The wheels 33 and 34 are further provided with arms 85 which have a pivotal connection with the opposite ends of rods 87 for transmitting movement of wheels 33 and 34 at corresponding ends of axles 31 and 32 to wheels 33 and 34 at the opposite ends of axles 31 and 32.

The channel members 16 and 17 at opposite ends of frame construction 11 lend rigidity to the frame construction and are further utilized for the attachment thereto of suitable spare tire supporting means as indicated in Figure 1.

It will be seen from the foregoing disclosure that a multi-wheel road vehicle is provided embodying tandem drive axles provided with drive wheels and tandem dead axles provided with dirigible wheels each of which axles is connected with the vehicle body base frame construction in a manner permitting the use of relatively long springs thereby providing a highly flexible construction, thus enabling the vehicle to readily follow irregular road surfaces with the minimum transmission of shocks and vibrations to the vehicle body as well as substantially reducing twisting strains in the springs. In view of the fact that the springs are secured to transversely extending frame members they can be readily offset from each other and made to overlap substantially. The length of the springs is accordingly not determined by the spacing of the axles. This is an important feature of this invention because the drive axles cannot be widely spaced without making it necessary to steer the rear wheels or, at least, a pair of said wheels. The steering of the rear wheels complicates the construction and increases its cost, so that increasing the spacing of the drive axles is to be avoided.

By the provision of the transverse channel members 13 and 14 which alone constitute the base frame construction adjacent the axles and between which the axles are disposed and to which the axles are connected by the spring suspensions sufficient room is provided for the free vertical oscillatory movement of the axles to the greater degree allowed by the long springs and by arranging the spring assemblies in transversely offset relation, in the manner disclosed, the length of the spring assemblies can be extended as may be desired by simply lapping the ends of the springs to the desired degree and securing the ends thereof to the opposite sides of the transverse channel members of the respective springs.

Furthermore it should be noted that by arranging the springs in offset relation as disclosed greater clearance is provided for steering the dirigible wheels.

A slight modification of my invention is disclosed in Figures 2 and 3 which correspond to the rear portion of Figure 1 and differ therefrom in the following respects. The spring assemblies 22 and 23 in accordance with this embodiment of the invention are secured intermediate their ends by U-bolts 91 to suitable seats 92 formed on the under sides of axle housings 19 and 21 thereby providing for a substantially lower body floor line and a bus with a low center of gravity. The spring assemblies 22 and 23, in accordance with this form of the invention, are secured to channel members 13 in transversely offset relation in the same manner as above disclosed relative to Figure 1 with the exception that in this form of the invention the adjacent lapping ends of each lateral pair of springs are connected to a single bracket 93 which may be a casting formed to engage the intermediate channel member 13 and secured thereto as disclosed, or in any other suitable manner. The bracket 93 may be constructed of any desired length depending upon the length of spring desired to be used.

A still further modification of the invention is disclosed in Figures 4 and 5 which corresponds to a front end construction in Figure 1, and in which the spring assemblies 35 and 36 are arranged and secured to channel members 14 in the same manner as disclosed in Figure 1 with the exception that the inner or adjacent lapping ends of spring assemblies 35 and 36 are connected with single brackets 95 similar to brackets 93 illustrated in Figures 2 and 3 and which are suitably secured to the intermediate channel member 14 as indicated or in any other suitable manner.

The steering arrangement, in accordance with this embodiment of the invention is the same as that illustrated in Figure 1 with the exception that arms 81 are connected through yielding spring ball connections with the opposite ends of a single drag link 97. A second drag link 98 from the steering gear has a spring ball connection with the adjacent arm 81 in slightly offset relation as indicated at 99 which provides a highly flexible steering arrangement as well as permitting most any angle of steering movement.

A still further modification of the invention is illustrated in Figure 6 wherein the intermediate channel member 14 is replaced by or has suitably mounted therein a transverse trunnion shaft 101 on each end of which is rotatably mounted an equalizing bar 102 which serves for the attachment of the adjacent ends of the spring assemblies 35 and 36 in the same manner as disclosed in Figure 5. In accordance with this embodiment of the invention the pivotally mounted bars 102 provide for an equalizing action between springs 35 and 36, whereby upon elevation of either axle with respect to the other the compression in the corresponding spring is partially transferred to the other springs thus providing for the cushioned vertical movement of one or both wheels of either axle with respect to the wheels of the other axle to a degree that exceeds the permissible movement of the axles in the constructions heretofore described. The bar 102 may be constructed of any desired length for accommodating longer or shorter spring assemblies.

A still further modification of the invention is illustrated in Figure 7 wherein an equalizing means is provided between springs 35 and 36 which is in the form of a pair of relatively closely longitudinally spaced hydraulic cylinders 103 interconnected through the closed tops thereof by a suitable connection 104 for permitting flow of fluid from one cylinder 103 to the other. Vertically reciprocally mounted in each cylinder 103 is a piston 105 the forward one of which is provided with an integral relatively long ear 106 and the rear one of which is provided with a relatively shorter ear 107. The rear end of spring 35 is flexibly connected with ear 107 by means of a shackle 108 and the forward end of spring 36 is pivotally connected to ear 106 by a pin 109.

The operation of this form of construction is substantially the same as that disclosed in Figure 6 wherein upon vertical movement of one or the other of axles 31 or 32 the respective springs will be compressed resulting in upward movement of their respective pistons which will force fluid from the cylinders in which they are mounted through connections 104 into the other cylinders occasioning downward movement of the pistons in said other cylinders thus transferring compression to the springs of the other axle. Thus the construction permits substantial independent movement of one or both wheels of either axle with respect to the wheels of the other axle beyond the capacity of deflection of the springs.

While the invention is disclosed as embodying motors of the internal combustion type the invention is not limited thereto as the spring suspension and drive construction disclosed is equally applicable in trackless trolleys or vehicles provided with electric motors supplied with current from over head trolleys. In the latter construction the electric motors would replace the internal combustion motors 46 as illustrated and the drive wheels would be driven in the same manner. In the use of electric motors the clutch and transmission would of course be eliminated.

The construction disclosed may further be adapted to rail cars either gas, gas-electric or electric by providing flanged rail engaging wheels and eliminating the steering arrangements.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as new and desire to secure by United States Letters Patent is:—

1. A road vehicle comprising a frame including longitudinal frame members and transverse frame members beyond said longitudinal frame members constituting the base frame of a passenger carrying body, a pair of drive axles supporting one end of said frame, a pair of springs for each drive axle, each of said springs extending beneath and overlapping said transverse members and being connected to said transverse members so that each axle is attached to said frame separately and independently of the other axle, a pair of motors supported on said frame, a drive shaft operatively connecting each of said motors with one of said drive axles to separately drive said axles, and means supported on the inwardly disposed axle for supporting the drive shaft for the outwardly disposed axle between its points of attachment to said rearmost axle and the motor to which it is connected.

2. The combination defined in claim 1 in which each of said motors is an internal combustion engine arranged adjacent the sides of said frame, and substantially midway between the ends thereof.

3. A road vehicle comprising a frame constituting the base of a passenger-carrying body, said frame including longitudinal members extending from end to end thereof substantially in the vertical planes of the body sides, a plurality of transverse members arranged adjacent each end of said frame in spaced relation to each other, a pair of axles arranged between the pairs of transversely extending members, springs secured to each axle and extending across the space between said parallel transverse members, the springs of each axle being separately and independently attached to said transverse members so that each axle is free to yield with respect to said frame independently of the adjacent axle, a pair of motors supported on said frame, a relatively long drive shaft extending from one of said motors to one of said axles, and a relatively short drive shaft extending from the other of said motors to the other of said axles.

4. A road vehicle comprising a frame constituting the base of a passenger-carrying body, said frame including longitudinal members extending from end to end thereof substantially in the vertical planes of the body sides, a plurality of transverse members arranged adjacent each end of said frame in spaced relation to each other, a pair of axles arranged between the pairs of transversely extending members, springs secured to each axle and extending across the space between said parallel transverse members, the springs of each axle being separately and independently attached to said transverse members so that each axle is free to yield with respect to said frame independently of the adjacent axle, a pair of internal combustion engines supported on said frame adjacent the longitudinally extending members and substantially midway between the ends thereof, and drive shafts extending from each of said engines to an axle so that each engine will drive one of said axles.

5. A road vehicle comprising a frame constituting the base frame of a passenger carrying body, said frame comprising a pair of outer longitudinal frame members, and a pair of frame members parallel to and spaced inwardly of said first named members, transverse members adjacent either end of said vehicle, certain of said transverse members interconnecting said second named frame members adjacent the ends thereof to said outer longitudinal frame members, a pair of drive axles supporting one end of said frame, a pair of springs for each drive axle, each of said springs extending beneath and overlapping said transverse members, so that each axle is attached to said frame separately and independently of the other axle, a pair of motors supported on said frame, and drive shafts operatively connecting said motors with said drive axles.

WILLIAM B. FAGEOL.